United States Patent [19]
Bergman et al.

[11] Patent Number: 6,119,166
[45] Date of Patent: Sep. 12, 2000

[54] CONTROLLING COMMUNICATIONS WITH LOCAL APPLICATIONS USING A BROWSER APPLICATION

[75] Inventors: Lawrence David Bergman, Mount Kisco; John J. E. Turek, So. Nyack, both of N.Y.

[73] Assignee: International Business Machines Corporation, Armonk, N.Y.

[21] Appl. No.: 08/828,463

[22] Filed: Mar. 28, 1997

[51] Int. Cl.[7] .................................................. G06F 13/00
[52] U.S. Cl. ........................................ 709/232; 709/300
[58] Field of Search ........................ 395/200.36, 200.47, 395/200.48, 200.49, 200.32, 200.33; 709/206, 217, 218, 219, 202, 203, 231, 232, 300

[56] References Cited

U.S. PATENT DOCUMENTS

| | | | |
|---|---|---|---|
| 5,761,663 | 6/1998 | Lagarde et al. | 395/200.33 |
| 5,793,964 | 8/1998 | Lagarde et al. | 395/200.79 |
| 5,838,906 | 11/1998 | Doyle et al. | 709/218 X |

OTHER PUBLICATIONS author unknown, Plug–In Guide, Netscape Communications Corporation, Chapters 1, 2, 5, 6, 8, Jan. 1997.
William Stanek, HTML, JAVA, CGI, VRML, SGML, Web Publishing, Unleashed, Sams Net Publishing, pp. 259–263, 335–346, Jan. 1996.

*Primary Examiner*—Zarni Maung
*Assistant Examiner*—Patrice Winder
*Attorney, Agent, or Firm*—Heslin & Rothenberg, P.C.

[57] ABSTRACT

A communications facility for interactive communications with local applications. The flow of information to local applications is coordinated using a browser. The browser determines, at any given time, which of a plurality of communication paths is to be used to provide the information to the local application. The local application commences a polling loop, which enables messages to be received at the local application via the plurality of communication paths, without terminating the local application. Thus, the local application can have interactive communications with the browser and/or one or more remote servers.

44 Claims, 6 Drawing Sheets

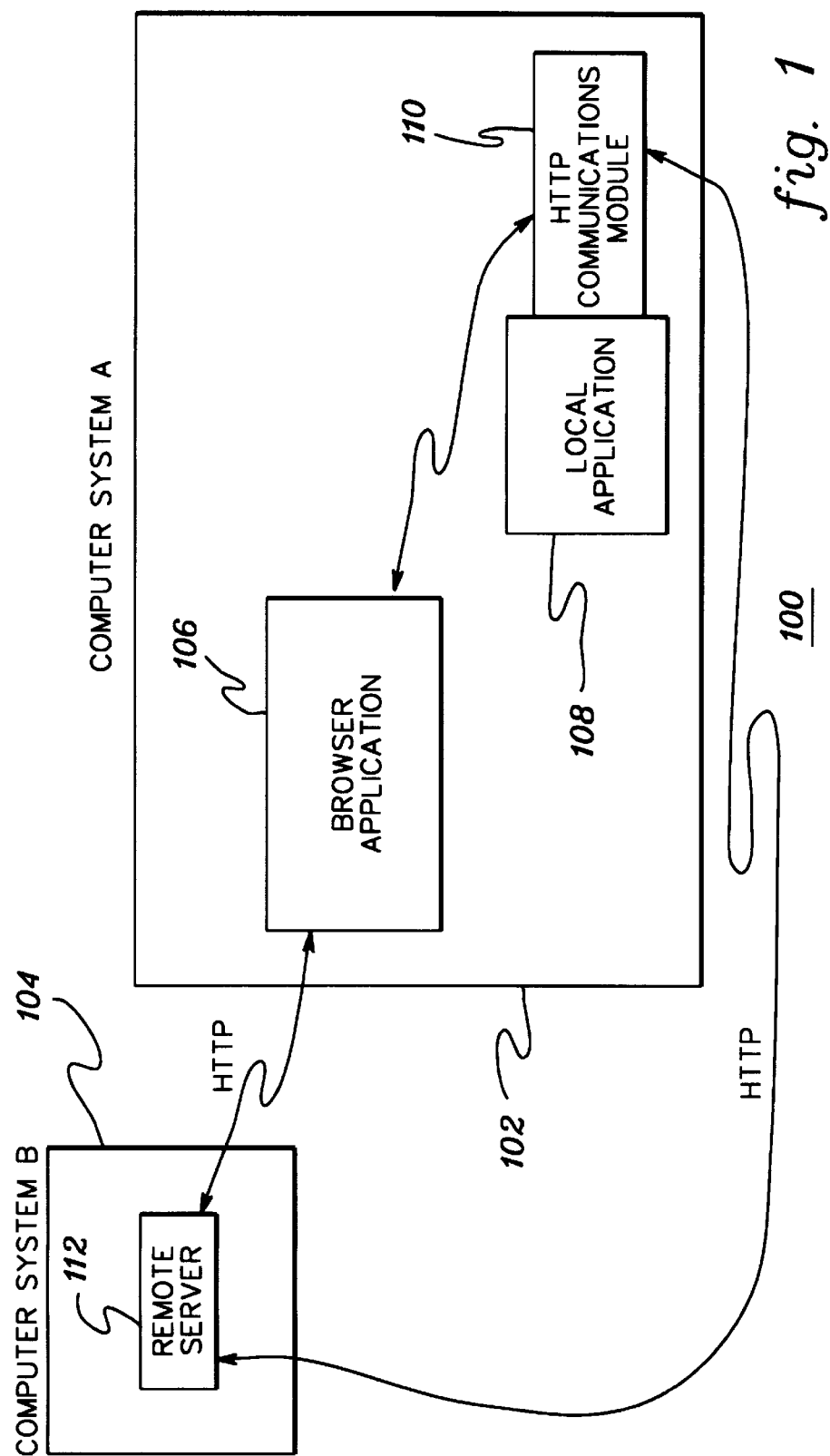

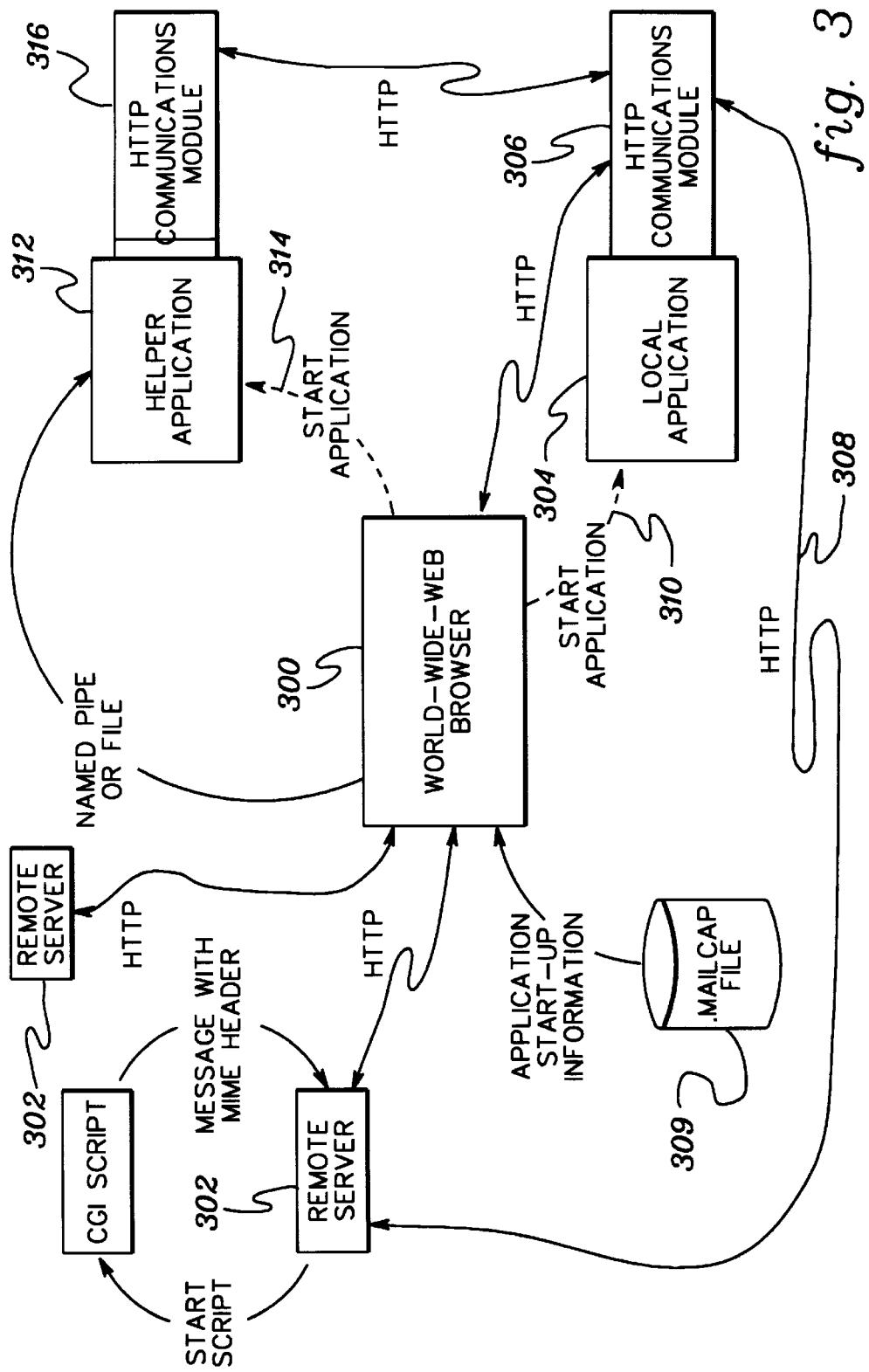

CONTROLLING COMMUNICATIONS WITH LOCAL APPLICATIONS USING A BROWSER APPLICATION

TECHNICAL FIELD

This invention relates, in general, to internet browser applications, and in particular, to using browser applications as a control point to coordinate the flow of information to local applications.

BACKGROUND ART

The explosive growth of the internet has led to a desire to integrate legacy (i.e., existing) applications with the World Wide Web. In particular, applications developers want to allow existing applications to receive information across the internet, post information to Web servers, and to receive inputs from and display outputs in Web browsers. Additionally, the growth of the internet has led to a need for interactive communications between client-side (local) applications and browser applications.

In one approach for integrating client-side applications with the Web, an application programming interface, such as the Common Client Interface offered by Mosaic is used This interface allows an application to register callbacks associated with particular MIME types encountered by the browser, and allows an application to send requests to a server by causing the browser to pass a Uniform Resource Locator (URL).

This interface, however, has a number of drawbacks. For example, the interface is browser-specific. Application code that uses the interface can communicate only through a single browser. To make use of another browser, the application code needs to be relinked with a browser-specific CCI library. Additionally, the interface does not allow for interactive communications between the local application and the browser.

Based on the foregoing, a need exists for a common coordination mechanism for communicating with local applications. In particular, a need exists for a browser application that can be used as the control point for coordinating activities for local applications. A further need exists for using a browser application to coordinate the flow of information between local applications and the browser application and between local applications and one or more remote servers. A yet further need exists for a facility that allows local applications to be interactive with the browser, that is to have sessions with the browser.

SUMMARY OF THE INVENTION

The shortcomings of the prior art are overcome and additional advantages are provided through the provision of a method for communicating with local applications. A local application is initiated, and a flow of information to the local application is coordinated using a browser. The browser determines, at any given time, which of a plurality of communication paths is to be used to provide information to the local application.

In one embodiment of the present invention, the plurality of communication paths include at least two of the following:

A first path in which the browser forwards a request to a server, the server passes information, responsive to the request, to the browser and the browser initiates forwarding of the information to the local application;

A second path in which the browser sends information to the local application based upon a selection made at the browser; and A third path in which the browser forwards a request to the server, the server passes one or more interactive or programmatic controls for the local application back to the browser, at least one of the controls is set at the browser, and the browser provides information corresponding to the interactive or programmatic controls to the local application.

In another embodiment of the present invention, a method for communicating with local applications is provided. The method includes initiating a local application and forwarding a first message from a browser to the local application. The browser selects a path of a plurality of communication paths for use in forwarding the first message. The method further includes continuing processing of the local application subsequent to receipt of the first message from the browser, and forwarding a second message from the browser to the local application during the continued processing. Once again, the browser selects a path for use in forwarding the second message.

In a further aspect of the present invention, a system for communicating with local applications is provided. The system includes a local application and a browser adapted to coordinate a flow of information to the local application. The browser determines, at any given time, which of a plurality of communication paths is to be used to provide information to the local application.

In yet a further aspect of the present invention, an article of manufacture including a computer useable medium having computer readable program code means embodied therein for causing communicating with local applications is provided. The computer readable program code means in the article of manufacture includes computer readable program code means for causing a computer to effect initiating a local application, and computer readable program code means for causing a computer to effect coordinating a flow of information to the local application. The coordination includes using a browser to determine, at any given time, which of a plurality of communication paths is to be used to provide information to the local application.

The present invention advantageously provides for a single coordination point for communicating with local applications. Additionally, it allows interactive communications between a browser and local applications.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention will be apparent from the following detailed description taken in conjunction with the accompanying drawings in which:

FIG. 1 depicts one example of a computing environment incorporating and using the communications facility of the present invention;

FIG. 3 depicts one embodiment of a computing environment using the communication paths of FIGS. 2b–2d, in accordance with the principles of the present invention.

BEST MODE FOR CARRYING OUT THE INVENTION

Figure 2A:
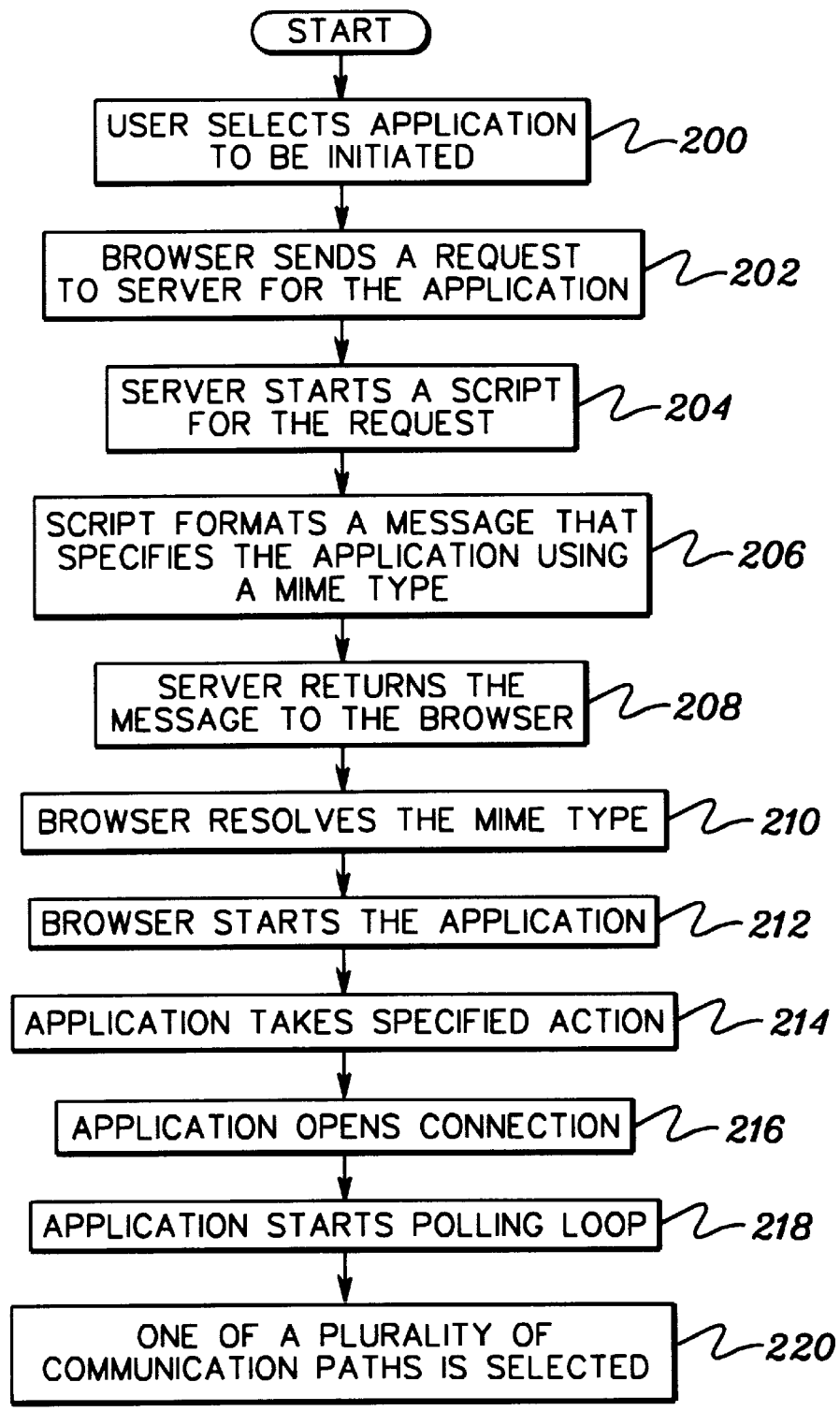
FIG. 2a depicts one embodiment of the logic associated with starting a local application, in accordance with the principles of the present invention.

In accordance with the principles of the present invention, a communications facility is provided for controlling communications with local applications. The flow of information to local applications is coordinated by a browser application, which determines at any given time, which of a plurality of communication paths is to be used to provide information to a local application.

In one embodiment, the communications facility of the present invention is incorporated and used in a computing environment, such as the one depicted in FIG. 1. Computing environment 100 includes, for instance, a first computer system 102, Computer System A, and a second computer system 104, Computer System B. Each of the computer systems can include, for example, a personal computer, a work station, a laptop computer or any other type of computer which supports browser and server applications.

Computer system 102 includes, for example, a browser application 106, such as a World Wide Web browser. The browser application is coupled to at least one local application 108 via, for instance, a hypertext transfer protocol (HTTP) communications module 110, which is coupled to local application 108. The HTTP communications module includes standard HTTP protocol logic. Additionally, browser application 106 is coupled to a remote server 112 on computer system 104 via HTTP. Further, in accordance with the present invention, local application 108 is also directly coupled to remote server 112 via a HTTP connection, although this is not necessary.

In the above example, each computer system is running, for instance, the OS/2 Operating System offered by International Business Machines Corporation. However, this is only one example. The computing environment described above is also only one example. The capabilities of the present invention can be used within other computing environments or with other computer systems without departing from the spirit of the present invention.

One embodiment of a technique for communicating with local applications is described in detail with reference to FIGS. 2a–2d. In particular, FIG. 2a depicts one example of starting a local application and FIGS. 2b–2d depict examples of communication paths used to communicate with the local application.

Figure 2B:
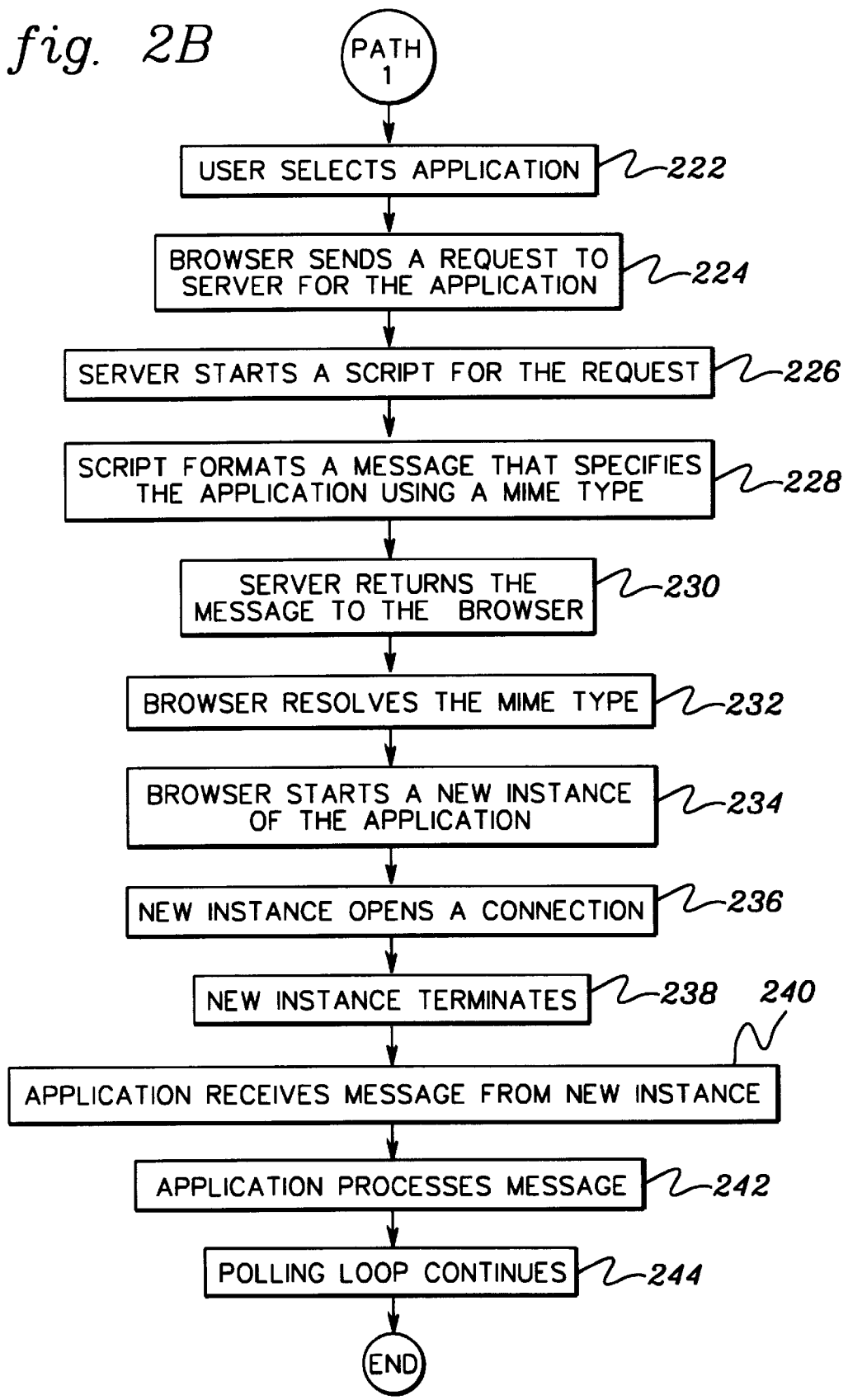
FIGS. 2b–2d depict examples of the logic associated with various communications paths used in interactively communicating with a local application, in accordance with the principles of the present invention.
Figure 2C:
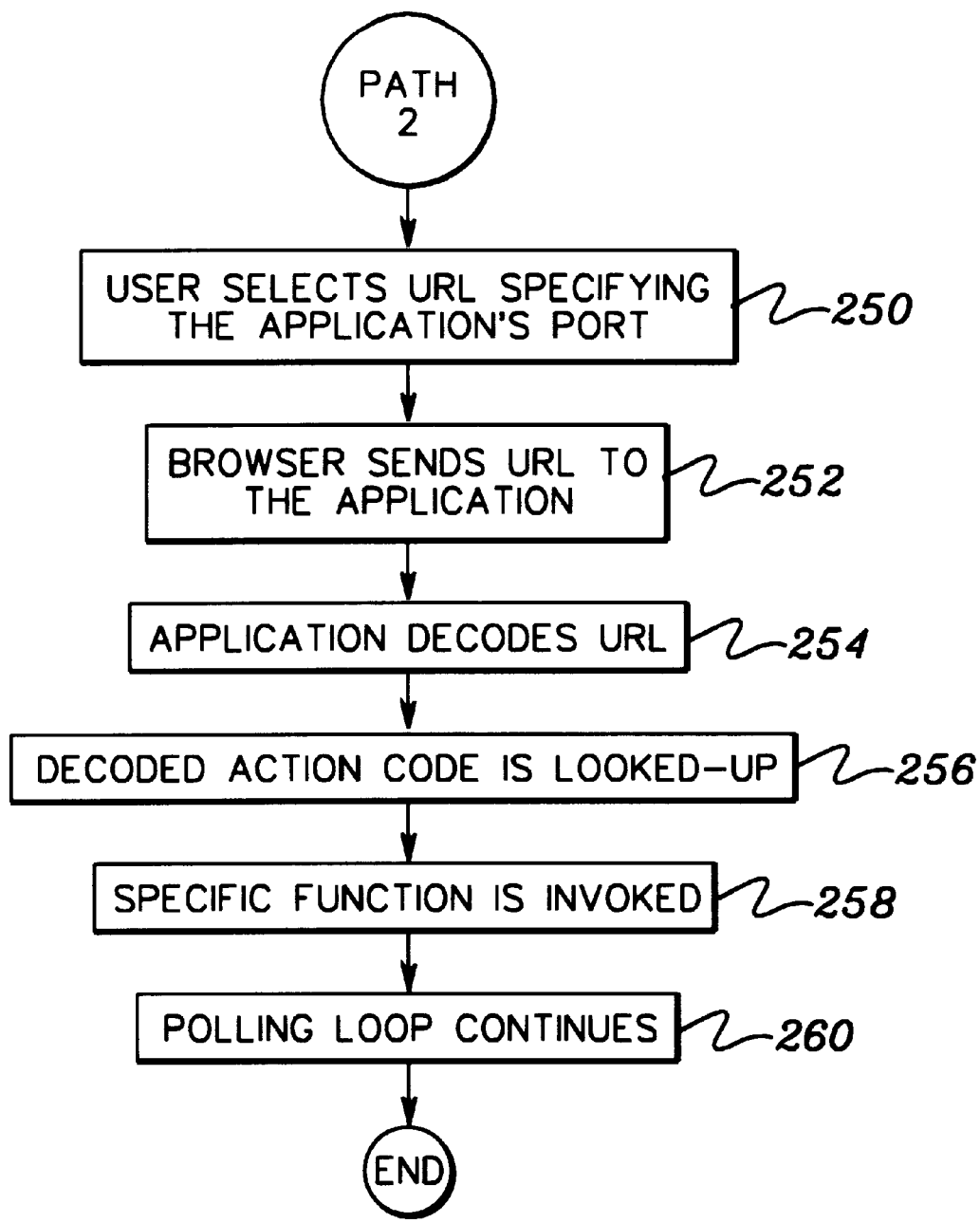
Figure 2D:
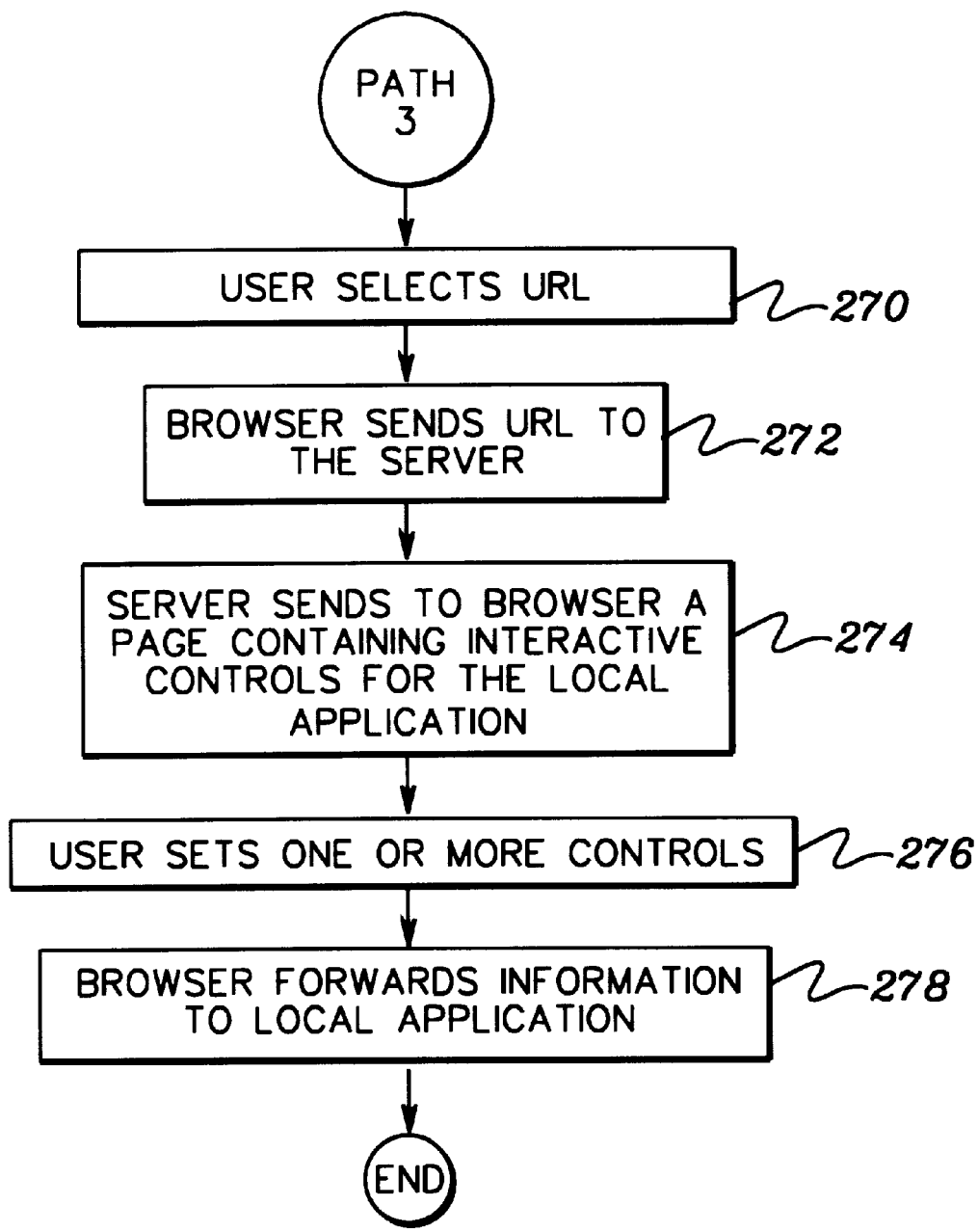

Referring to FIG. 2a, initially a local application is selected to be executed, STEP 200. This selection is made by, for example, a user choosing a uniform resource locator (URL) in a browser (e.g., a browser application) that corresponds to the local application to be run. In another embodiment, the application may be selected by software or some other mechanism. The local application can be one of any variety of applications, including, but not limited to, spread sheets, visualization programs or any other programs.

By selecting the URL in the browser, the browser sends a request to the remote server for that application, STEP 202. The remote server in turn starts, for instance, a Common Gateway Interface (CGI) script for the local application, STEP 204. The CGI script knows about the local application, since it is written for that particular application. Each application has a script on the server side. The CGI script formats a message, which includes a MIME header specifying the local application and optionally, a message body (parameters) for starting the local application, STEP 206.

The server returns the formatted message to the browser, STEP 208, and the browser uses a MAILCAP file to determine which program corresponds to the MIME header, STEP 210. (The MAILCAP file is a standard mechanism used for starting up local applications based on information coming from the server. Applications started in this manner include, for instance, MPEGplay for playing video and REALaudio for listening to audio clips.) In particular, the MAILCAP file includes a list of local applications and their associated MIME types. Thus, a search of the MIME type, designated in the header, identifies the local application to be started. Another part of the entry in the MAILCAP file is a special symbol, % s, that indicates a name of a temporary file in which the browser has stored the remainder of the message. When the browser starts up the specified application, STEP 212, the local application obtains the body of the MIME message from the temporary file and takes whatever actions are specified, STEP 214. In particular, in one example, the local application decodes the URL to obtain an action code, searches a look-up table for the action code in order to determine the action to be taken, and then takes that action. At this point, the local application is up and running.

In addition to the above, in one example, the local application starts a connection with the local browser application, STEP 216. The port number used to open the connection is included in the MIME message stored in the temporary file. The local application and, in particular, the HTTP communications module coupled to the local application, uses the port number to start a connection on the prespecified port with the World Wide Web browser.

Thereafter, the local application starts a polling loop, STEP 218, which will enable interactive communications to occur between the browser and the local application. The interactive communications also involve the remote server, since some of the information is obtained from the remote server via the browser. During the polling loop, the browser chooses one of a plurality of communication paths in order to interactively communicate with the local application, STEP 220. The communication path chosen is dependent on the information located at the browser, as described below.

In accordance with the principles of the present invention, a variety of communication paths are possible, which are controlled or mediated by the browser application. An example of one such communication path is described in detail with reference to FIG. 2b. In this embodiment, a URL in the browser is selected by, for instance, a user or an applications program, STEP 222. The URL specifies, for example, the local application. Subsequent to selecting the URL, the browser sends a request for the local application to the remote server, STEP 224. The server again starts a script for the request, as described above, STEP 226, which formats a message that specifies the application using the special MIME type, STEP 228. The server then returns the message to the browser, STEP 230. Thus, any messages that come through the browser for the local application are going to have the special MIME type. The MIME type is used for starting up the local application, as described above, and for providing additional messages to the local application.

When the browser receives the MIME type, the browser uses the MAILCAP file to resolve the MIME type, STEP 232. Thereafter, it starts up a new instance of the local application specified by the MIME type, STEP 234. The new instance of the application attempts to open up an HTTP connection on the port designated in the message, STEP 236. Since that port is already in use, the connection has previously been started, and thus, the new instance of the application is referred to as a helper application. The helper application is used to provide messages to the local application, as described herein.

The helper application forwards the message to the local application and it terminates, STEP 238. Subsequently, the local application receives the message, STEP 240. In particular, the helper application sends the body of the MIME message over the HTTP connection to the local application. Thus, the helper application enables additional messages to be passed from the server to the local application without terminating the local application.

When the local application receives the message, it processes the message, STEP 242, as described above, and continues with the polling loop, STEP 244. During the polling loop, a new message may come in for the local application. When this occurs, the helper application can be started up, once again, or in accordance with the principles of the present invention, another communication path can be selected by the browser.

A second communication path that can be used to interactively communicate between the browser and the local application is described in detail with reference to FIG. 2c. In this embodiment, the local application and the browser interactively communicate without referring back to the server. That is, the local application can have interactive sessions with the browser.

For example, a URL located at the browser is selected by a user or a program, STEP 250. The URL specifies the communications port for the desired local application, as well as an action code that identifies the action to be taken by the local application. The browser sends the URL to the local application over the port designated by the URL, STEP 252, and the local application decodes the URL to obtain the action code, STEP 254. The local application then searches a look-up table for the action code in order to determine the action to be taken by the application, STEP 256. Examples of actions to be taken include, for instance, the creation of a new visualization object, the attachment of a name to a new object, the provision of parameters to an object, or any other types of actions.

The specified action is invoked by calling a call-back function, associated with the action, to perform the action, STEP 258. Thus, in this embodiment there is a call-back function for each action code that can be specified in the look-up table.

Thereafter, the polling loop of the local application continues, waiting for additional messages, STEP 260. When additional messages are received by the browser, the browser determines which communication path is to be used to send the messages to the local application. Either of the two paths described above can be used, as well as any other communication path controlled by the browser. An example of a third communication path controlled by the browser is described in detail with reference to FIG. 2d.

In one example, a URL located at the browser is selected, which specifies the local application to receive the message, STEP 270. The browser sends the URL to the server, STEP 272, which in turn sends back to the browser a page (e.g., an HTML page) containing interactive or programmatic controls for the local application designated by the URL, STEP 274. The browser receives the page and enables the user to set the controls located on the page, STEP 276. As examples, the controls are set by filling in one or more fields on the page, selecting one or more choices from the page or any combination of the above. Once the controls are set, the browser forwards information to the local application, based on the controls, STEP 278. This information is forwarded to the local application via the first or second communication path described above.

Described herein are examples of three communication paths that can be used to interactively communicate with local applications. One operational example of these communication paths working together is depicted in FIG. 3 and described in detail below. As depicted in FIG. 3, a browser application 300 is the controlling point for coordinating the activities between one or more remote servers 302 and a local application 304. Each remote server is coupled to the browser via, for example, an HTTP connection. Additionally, the browser is directly coupled to the local application via an HTTP connection. In particular, the local application has an HTTP communications module 306, which provides the connection to the browser. The local application can also directly communicate with one or more remote servers via one or more HTTP connections 308.

Local application 304 is started by the browser (310), when the browser receives from one of the remote servers 302 a message having the special MIME type designating the local application. The local application is started using information retrieved from MAILCAP file 309, which designates the application to be started. During processing of the local application, a polling loop is started in order to provide interactive communications with the browser and/or the server. During this polling loop, communication paths are selected for communicating with the local application.

One of the communication paths includes the use of a helper application 312 (an instance of the local application), which is started by the browser application at 314. The helper application includes an HTTP communications module 316, which communicates with HTTP communications module 306 of the local application. That is, the helper application passes a message to the local application, while the local application remains processing. At the end of passing the message to the local application, the helper application terminates and may be started again for another message.

In addition to the above, the local application can receive messages from the browser without the use of the helper application. That is, a URL at the browser can be specified, which indicates directly to the local application an action to be taken by the local application. Further, the browser may receive a page from a remote server designating one or more interactive or programmatic controls, which are set by, for instance, a user or other mechanism to inform the local application of action to be taken. The controls can include, for instance, controls from a plurality of servers. In all of these cases, the browser application mediates the communication with the local application, enabling the local application to have interactive communications with the browser. The browser can further act as a switchboard between multiple servers.

In accordance with the principles of the present invention, a communications facility is provided which enables interactive communications between local applications and a browser application, as well as interactive communications between local applications and remote servers via a browser application. The communications facility of the present invention facilitates the integration of legacy applications with the World Wide Web. For example, the source code of a legacy application can be divided into a number of call-back routines and a call-back table can be created. Then, action codes can be specified to invoke the call-back routines.

The local application will process the routine and send a page back to the browser via the HTTP protocol to complete the transaction.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

The flow diagrams depicted herein are just exemplary. There may be many variations to these diagrams or the steps (or operations) described therein without departing from the spirit of the present invention. For instance, the steps may be performed in a different order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for communicating with local applications, said method comprising:
    initiating a local application; and
    coordinating a flow of information to said local application, said coordinating comprising using a separate, local browser application ("browser") to determine, at any given time, which of a plurality of communication paths is to be used to provide information to said local application.

2. The method of claim 1, wherein said local application is an interactive application directly connected to said browser.

3. The method of claim 1, wherein said plurality of communication paths comprise at least two of the following:
    a first path in which said browser forwards a request to a server, said server passes information, responsive to said request, to said browser and said browser initiates forwarding of said information to said local application;
    a second path in which said browser sends information to said local application based on a selection made at said browser; and
    a third path in which said browser forwards a request to said server, said server passes one or more of at least one of interactive and programmatic controls for the local application back to said browser, at least one of said one or more controls is set at said browser and said browser provides information corresponding to the one or more controls to said local application.

4. The method of claim 3, wherein said initiating forwarding of said information to said local application in said first path further comprises passing said information to said local application via a new instance of said local application started by said browser.

5. The method of claim 4, wherein said passing of information by said server to said browser in said first path comprises providing to said browser a MIME type indicative of said new instance to be started.

6. The method of claim 3, wherein said information sent to said local application in said second path comprises an action code, and wherein said method further comprises decoding said action code, by said local application, to determine an action to be taken by said local application.

7. The method of claim 3, wherein said providing of information to said local application in said third path comprises using said first path or said second path to provide said information.

8. The method of claim 1, further comprising providing a direct communication path between a remote server and said local application, said direct communication path being independent of said browser.

9. The method of claim 1, wherein said coordinating further comprises:
    determining, by said browser, which information received from a plurality of servers is to be presented to said local application; and
    providing said information, after it is determined, to said local application via a communication path selected by said browser.

10. A method for communicating with local applications, comprising:
    initiating a local application;
    forwarding a first message from a separate, local browser application ("browser") to said local application, said forwarding comprising selecting, by said browser, a path of a plurality of communication paths for use in forwarding said first message;
    continuing processing of said local application subsequent to receipt of said first message from said browser; and
    forwarding a second message from said browser to said local application during said continuing processing, said forwarding comprising selecting, by said browser, a path of said plurality of communication paths for use in forwarding said second message.

11. The method of claim 10, wherein said path for forwarding said first message and said path for forwarding said second message are different communication paths.

12. The method of claim 10, wherein said path for forwarding said first message and said path for forwarding said second message are the same communication path.

13. The method of claim 10, wherein said plurality of communication paths comprise at least two of the following:
    a first path in which said browser forwards a request to a server, said server passes information, responsive to said request, to said browser and said browser initiates forwarding of said information to said local application;
    a second path in which said browser sends information to said local application based on a selection made at said browser; and
    a third path in which said browser forwards a request to said server, said server passes one or more of at least one of interactive and programmatic controls for the local application back to said browser, at least one of said one or more controls is set at said browser and said browser provides information corresponding to the one or more controls to said local application.

14. The method of claim 13, wherein said initiating forwarding of said information to said local application in said first path further comprises passing said information to said local application via a new instance of said local application started by said browser.

15. The method of claim 10, further comprising forwarding additional messages to said local application without terminating said local application, said forwarding comprising using said browser to select at least one communication path for use in forwarding said additional messages.

16. A system for communicating with local applications, said system comprising:

a local application; and a separate, local browser application ("browser") adapted to coordinate a flow of information to said local application, said browser determining, at any given time, which of a plurality of communication paths is to be used to provide information to said local application.

17. The system of claim 16, wherein said local application is an interactive application directly connected to said browser.

18. The system of claim 16, wherein said plurality of communication paths comprise at least two of the following:
   a first path in which said browser forwards a request to a server, said server passes information, responsive to said request, to said browser and said browser initiates forwarding of said information to said local application;
   a second path in which said browser sends information to said local application based on a selection made at said browser; and
   a third path in which said browser forwards a request to said server, said server passes one or more of at least one of interactive and programmatic controls for the local application back to said browser, at least one of said one or more controls is set at said browser and said browser provides information corresponding to the one or more controls to said local application.

19. The system of claim 18, further comprising a new instance of said local application started by said browser, said new instance passing said information to said local application in said first path.

20. The system of claim 18, wherein said information sent to said local application in said second path comprises an action code and wherein said local application is adapted to decode said action code to determine an action to be taken by said local application.

21. The system of claim 18, wherein said third path comprises means for using said first path or said second path to provide said information to said local application.

22. The system of claim 16, further comprising a direct communication path between a remote server and said local application, said direct communication path being independent of said browser.

23. The system of claim 16, wherein said browser is further adapted to determine which information received from a plurality of servers is to be presented to said local application and to provide said information, after it is determined, to said local application via a communication path selected by said browser.

24. A system for communicating with local applications, comprising:
   means for initiating a local application;
   means for forwarding a first message from a separate. local browser application ("browser") to said local application, said means for forwarding comprising means for selecting, by said browser, a path of a plurality of communication paths for use in forwarding said first message;
   means for continuing processing of said local application subsequent to receipt of said first message from said browser; and
   means for forwarding a second message from said browser to said local application during said continuing processing, said means for forwarding comprising means for selecting, by said browser, a path of said plurality of communication paths for use in forwarding said second message.

25. The system of claim 24, wherein said path for forwarding said first message and said path for forwarding said second message are different communication paths.

26. The system of claim 24, wherein said path for forwarding said first message and said path for forwarding said second message are the same communication path.

27. The system of claim 24, wherein said plurality of communication paths comprise at least two of the following:
   a first path in which said browser forwards a request to a server, said server passes information, responsive to said request, to said browser and said browser initiates forwarding of said information to said local application;
   a second path in which said browser sends information to said local application based on a selection made at said browser; and
   a third path in which said browser forwards a request to said server, said server passes one or more of at least one of interactive and programmatic controls for the local application back to said browser, at least one of said one or more controls is set at said browser and said browser provides information corresponding to the one or more controls to said local application.

28. The system of claim 27, further comprising a new instance of said local application started by said browser, said new instance passing said information to said local application in said first path.

29. The system of claim 24, further comprising means for forwarding additional messages to said local application without terminating said local application, said means for forwarding comprising means for using said browser to select at least one communication path for use in forwarding said additional messages.

30. An article of manufacture comprising:
   a computer useable medium having computer readable program code means embodied therein for causing communicating with local applications, the computer readable program code means in said article of manufacture comprising:
      computer readable program code means for causing a computer to effect initiating a local application; and
      computer readable program code means for causing a computer to effect coordinating a flow of information to said local application, said coordinating comprising using a separate, local browser application ("browser") to determine, at any given time, which of a plurality of communication paths is to be used to provide information to said local application.

31. The article of manufacture of claim 30, wherein said local application is an interactive application directly connected to said browser.

32. The article of manufacture of claim 30, wherein said plurality of communication paths comprise at least two of the following:
   a first path in which said browser forwards a request to a server, said server passes information, responsive to said request, to said browser and said browser initiates forwarding of said information to said local application;
   a second path in which said browser sends information to said local application based on a selection made at said browser; and
   a third path in which said browser forwards a request to said server, said server passes one or more of at least one of interactive and programmatic controls for the local application back to said browser, at least one of said one or more controls is set at said browser and said browser provides information corresponding to the one or more controls to said local application.

33. The article of manufacture of claim 32, wherein said first path comprises computer readable program code means for causing a computer to effect passing said information to said local application via a new instance of said local application started by said browser.

34. The article of manufacture of claim 33, wherein said first path further comprises computer readable program code means for causing a computer to effect providing to said browser a MIME type indicative of said new instance to be started.

35. The article of manufacture of claim 32, wherein said information sent to said local application in said second path comprises an action code and wherein said article of manufacture further comprises computer readable program code means for causing a computer to effect decoding said action code, by said local application, to determine an action to be taken by said local application.

36. The article of manufacture of claim 32, wherein said third path comprises computer readable program code means for causing a computer to effect using said first path or said second path to provide said information.

37. The article of manufacture of claim 30, further comprising computer readable program code means for causing a computer to effect providing a direct communication path between a remote server and said local application, said direct communication path being independent of said browser.

38. The article of manufacture of claim 30, wherein said computer readable program code means for causing a computer to effect coordinating further comprises:
   computer readable program code means for causing a computer to effect determining, by said browser, which information received from a plurality of servers is to be presented to said local application; and
   computer readable program code means for causing a computer to effect providing said information, after it is determined, to said local application via a communication path selected by said browser.

39. An article of manufacture comprising:
   a computer useable medium having computer readable program code means embodied therein for causing communicating with local applications, the computer readable program code means in said article of manufacture comprising:
      computer readable program code means for causing a computer to effect initiating a local application;
      computer readable program code means for causing a computer to effect forwarding a first message from a separate, local browser application ("browser") to said local application, said forwarding comprising selecting, by said browser, a path of a plurality of communication paths for use in forwarding said first message;
      computer readable program code means for causing a computer to effect continuing processing of said local application subsequent to receipt of said first message from said browser; and
      computer readable program code means for causing a computer to effect forwarding a second message from said browser to said local application during said continuing processing, said forwarding comprising selecting, by said browser a path of said plurality of communication paths for use in forwarding said second message.

40. The article of manufacture of claim 39, wherein said path for forwarding said first message and said path for forwarding said second message are different communication paths.

41. The article of manufacture of claim 39, wherein said path for forwarding said first message and said path for forwarding said second message are the same communication path.

42. The article of manufacture of claim 39, wherein said plurality of communication paths comprise at least two of the following:
   a first path in which said browser forwards a request to a server, said server passes information, responsive to said request, to said browser and said browser initiates forwarding of said information to said local application;
   a second path in which said browser sends information to said local application based on a selection made at said browser; and
   a third path in which said browser forwards a request to said server, said server passes one or more of at least one of interactive and programmatic controls for the local application back to said browser, at least one of said one or more controls is set at said browser and said browser provides information corresponding to the one or more controls to said local application.

43. The article of manufacture of claim 42, wherein said first path comprises computer readable program code means for causing a computer to effect passing said information to said local application via a new instance of said local application started by said browser.

44. The article of manufacture of claim 39, further comprising computer readable program code means for causing a computer to effect forwarding additional messages to said local application without terminating said local application, said forwarding comprising using said browser to select at least one communication path for use in forwarding said additional messages.

* * * * *